United States Patent
Lee et al.

(10) Patent No.: US 9,719,592 B2
(45) Date of Patent: Aug. 1, 2017

(54) POWER TRANSMISSION APPARATUS FOR VEHICLE

(71) Applicant: Hyundai Motor Company, Seoul (KR)

(72) Inventors: Kyeonghun Lee, Seoul (KR); Jongsool Park, Hwaseong-si (KR); Suengho Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 15 days.

(21) Appl. No.: 14/553,373

(22) Filed: Nov. 25, 2014

(65) Prior Publication Data

US 2015/0167806 A1    Jun. 18, 2015

(30) Foreign Application Priority Data

Dec. 18, 2013 (KR) .................. 10-2013-0158814

(51) Int. Cl.
*B60K 6/48*     (2007.10)
*F16H 61/04*    (2006.01)
(Continued)

(52) U.S. Cl.
CPC ........ *F16H 61/0403* (2013.01); *B60K 6/365* (2013.01); *B60K 6/48* (2013.01); *B60K 6/547* (2013.01); *F16H 3/006* (2013.01); *B60K 2006/4816* (2013.01); *B60K 2006/4841* (2013.01); *F16H 2003/008* (2013.01); *F16H 2003/0931* (2013.01); *F16H 2200/0043* (2013.01); *F16H 2200/2005* (2013.01);
(Continued)

(58) Field of Classification Search
CPC ............... F16H 3/006; F16H 2003/008; F16H 2003/0931; F16H 2200/2005; B60K 6/365; B60K 6/48; B60K 6/547; B60K 2006/4841; B60K 2006/4816; Y02T 10/6221; Y02T 10/6256; Y10S 903/919
USPC ............................................. 475/5, 218, 302
See application file for complete search history.

(56) References Cited

U.S. PATENT DOCUMENTS 7,155,994 B2   1/2007  Gumpoltsberger
7,383,749 B2   6/2008  Schafer et al.
(Continued)

FOREIGN PATENT DOCUMENTS

EP   1937501 A1    7/2008
EP   2 189 318 B1  6/2012
(Continued)

*Primary Examiner* — Roger Pang
(74) *Attorney, Agent, or Firm* — Morgan Lewis & Bockius LLP

(57) ABSTRACT

A power transmission apparatus for a vehicle may include a first input shaft adapted to selectively receive torque of an engine, a second input shaft disposed without rotational interference with the first input shaft, a third input shaft disposed in a row with the second input shaft and without rotational interference with the first input shaft, a planetary gear set including a first rotation element, a second rotation element directly connected to the third input shaft, and a third rotation element directly connected to the first input shaft, a motor/generator directly connected to the first rotation element, a first speed output unit adapted to convert torque input from the second input shaft or the third input shaft and output the converted torque, and a second speed output unit adapted to convert torque input from the second input shaft or the third input shaft and output the converted torque.

14 Claims, 4 Drawing Sheets

(51) Int. Cl.
  *B60K 6/547*   (2007.10)
  *F16H 3/00*    (2006.01)
  *B60K 6/365*   (2007.10)
  *F16H 3/093*       (2006.01)

(52) U.S. Cl.
  CPC ........ *Y02T 10/6221* (2013.01); *Y02T 10/6256* (2013.01); *Y10S 903/919* (2013.01)

(56) References Cited

U.S. PATENT DOCUMENTS

| | | |
|---|---|---|
| 2009/0280942 A1 | 11/2009 | Gumpoltsberger |
| 2010/0125020 A1 | 5/2010 | Ikegami et al. |
| 2012/0115674 A1* | 5/2012 | Ikegami ............... B60K 6/36 477/3 |
| 2012/0115677 A1* | 5/2012 | Sakai ................... B60K 6/387 477/5 |
| 2012/0116629 A1* | 5/2012 | Kamoshida .......... B60K 6/36 701/22 |
| 2012/0123621 A1* | 5/2012 | Kishi .................... B60K 6/48 701/22 |
| 2012/0258830 A1 | 10/2012 | Yoon |
| 2013/0096761 A1* | 4/2013 | Kuroda ................ B60K 6/48 701/22 |
| 2014/0213410 A1 | 7/2014 | Mori |
| 2015/0167803 A1* | 6/2015 | Lee ....................... F16H 61/0403 475/5 |
| 2015/0167804 A1* | 6/2015 | Lee ....................... B60K 6/365 475/5 |
| 2015/0167805 A1* | 6/2015 | Lee ....................... F16H 61/0403 475/5 |
| 2015/0375610 A1* | 12/2015 | Okubo ................. B60K 6/36 180/65.25 |

FOREIGN PATENT DOCUMENTS

| | | | |
|---|---|---|---|
| JP | 2004-239441 A | 8/2004 | |
| JP | 4566199 B2 | 8/2010 | |
| JP | 2010-285012 A | 12/2010 | |
| JP | WO 2010143463 A1 * | 12/2010 | ............ B60K 6/387 |
| KR | 10-1181746 B1 | 9/2012 | |
| KR | 10-2015-0071602 A | 6/2015 | |
| KR | 10-2015-0071603 A | 6/2015 | |
| WO | WO 2007/042109 A1 | 7/2007 | |

\* cited by examiner

FIG. 2

| Speed | CL1 | CL2 | CL3 | SL1 | | SL2 | SL3 | SL4 | Note |
|---|---|---|---|---|---|---|---|---|---|
| | | | | 1st | 4th | 2nd | 3rd | R | |
| Reverse Speed | | ● | | ● | | | | ● | |
| Neutral | | | | ● | | | | | Engine on |
| Neutral Charging | ● | | | ● | | | | | |
| D1 | ● | | ● | ● | | | | | |
| D2 | | ● | | | | ● | | | |
| D3 | ● | | ● | | | | ● | | |
| D4 | | ● | | | ● | | | | |
| HEV D1 | ● | | | ● | | | | | Engine on, Motor on |
| HEV D2 | ● | | | | | | ● | | |
| EV D1 | | | ● | ● | | | | | Engine off, Motor on |
| EV D2 | | | ● | | | | ● | | |
| EV reverse Speed | | | ● | ● | | | | | Engine off, Motor Rotating Inversely |

POWER TRANSMISSION APPARATUS FOR VEHICLE

CROSS-REFERENCE TO RELATED APPLICATION

The present application claims priority to Korean Patent Application No. 10-2013-0158814 filed in Dec. 18, 2013, the entire contents of which is incorporated herein for all purposes by this reference.

BACKGROUND OF THE INVENTION

Field of the Invention

The present invention relates to a power transmitting apparatus for a vehicle. More particularly, the present invention relates to a power transmitting apparatus for a vehicle that realizes smooth start and quick shift by adding a motor/generator and a planetary gear set to a double clutch transmission motor/generator and improves fuel economy by realizing regenerative braking and starts charging.

Description of Related Art

Environmentally-friendly technique of vehicles is a very important technique on which survival of future motor industry is dependent. Vehicle makers are focusing on development of environmentally-friendly vehicles so as to meet environment and fuel consumption regulations.

Some examples of future vehicle technique are an electric vehicle (EV) and a hybrid electric vehicle (HEV) that use electrical energy, and double clutch transmission (DCT) that improves efficiency and convenience.

In addition, the vehicle makers promote improvement of efficiency in a power delivery system so as to meet exhaust regulation of countries and improve fuel consumption performance. In order to improve efficiency of the power delivery system, the vehicle makers are trying to put an idle stop and go (ISG) system and a regenerative braking system to practical use.

The ISG system stops an engine when a vehicle stops and restarts the engine when the vehicle begins to run. The regenerative braking system operates a generator using kinetic energy of the vehicle instead of braking the vehicle by friction when the vehicle brakes, stores electrical energy generated at this time in a battery, and reuses the electrical energy when the vehicle runs.

In addition, the hybrid electric vehicle is a vehicle using more than two power sources, and more than two power sources are combined in various ways. Typically, the hybrid electric vehicle uses a gasoline engine or a diesel engine driven by fossil fuel and a motor/generator driven by electrical energy.

In addition, one example of a transmission applied to the hybrid electric vehicle is the DCT. According to the DCT, two clutches are applied to a manual transmission layout. Therefore, efficiency and convenience may be improved.

That is, the DCT achieves odd-numbered-speeds and even-numbered-speeds alternately by using two clutches. A mechanism achieving the odd-numbered-speeds and the even-numbered-speeds alternately improves shift feel so as to solve problems of a conventional manual transmission (MT) and an automated manual transmission (AMT).

However, the DCT has such problems that clutch damage and energy loss due to clutch slip may occur when starting, safety may not be secured since backward rolling due to clutch slip occurs excessively in hill-start, shift shock may be strong compared with an automatic transmission since shift time is controlled to be short due to thermal capacity of a clutch.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmitting apparatus for a vehicle having advantages of realizing smooth start and quick shift by adding a motor/generator and a planetary gear set to a double clutch transmission motor/generator and improving fuel economy by realizing regenerative braking and start charging.

Various aspects of the present invention are additionally directed to providing a power transmitting apparatus for a vehicle having further advantages of achieving a reverse speed by driving torque of an engine or by rotating a motor/generator inversely.

According to various aspects of the present invention. a power transmission apparatus for a vehicle may include a first input shaft adapted to selectively receive torque of an engine, a second input shaft disposed without rotational interference with the first input shaft, adapted to selectively receive the torque of the engine, and having at least one input gear fixedly disposed thereon, a third input shaft disposed in a row with the second input shaft and without rotational interference with the first input shaft, and having at least one input gear fixedly disposed thereon, a planetary gear set including a first rotation element, a second rotation element directly connected to the third input shaft, and a third rotation element directly connected to the first input shaft, a motor/generator connected to the fourth input shaft and operated as a motor or a generator, a first speed output unit adapted to convert torque input from the second input shaft or the third input shaft and output the converted torque, and a second speed output unit adapted to convert torque input from the second input shaft or the third input shaft and output the converted torque.

At least one input gear fixedly disposed on the second input shaft may achieve even-numbered speeds, and at least one input gear fixedly disposed on the third input shaft may achieve odd-numbered speeds.

A first input gear for achieving a fourth forward speed and a second input gear for achieving a second forward speed may be fixedly disposed on the second input shaft, and a third input gear for achieving a first forward speed or a reverse speed and a fourth input gear for achieving a third forward speed may be fixedly disposed on the third input shaft.

The planetary gear set may be a double pinion planetary gear set, the first rotation element may be a sun gear, the second rotation element may be a ring gear, and the third rotation element may be a planet carrier.

The power transmission apparatus may further include a first clutch selectively connecting the engine to the first input shaft, and a second clutch selectively connecting the engine to the second input shaft.

The power transmission apparatus may further include a third clutch selectively connecting two rotation elements among the first, second and third rotation elements of the planetary gear set and selectively direct-coupling the planetary gear set.

Each of the second and third input shafts may be a hollow shaft, and the first input shaft may penetrate through the second and third input shafts.

The second and third input shafts may be disposed in a sequence of the second and third input shafts from one end to another end of the first input shaft.

The third clutch may be disposed at one side of the planetary gear set and may selectively connect the first input shaft to the motor/generator so as to direct-couple the planetary gear set.

The third clutch may be disposed on one end portion of the third input shaft and may selectively connect the first input shaft to the third input shaft so as to direct-couple the planetary gear set.

The third clutch may be disposed at another end portion of the third input shaft and may selectively connect the third input shaft with the motor/generator so as to direct-couple the planetary gear set.

The first speed output unit may include a first output shaft disposed in parallel with the second and third input shafts, a first output gear fixedly disposed on the first output shaft and outputting torque of the first output shaft, first and fourth speed gears rotatably disposed on the first output shaft, and a first synchronizer selectively connecting the first speed gear or the fourth speed gear to the first output shaft.

The first speed gear may be engaged with the third input gear and the fourth speed gear may be engaged with the first input gear.

The second speed output unit may include a second output shaft disposed in parallel with the second and third input shafts, a second output gear fixedly disposed on the second output shaft and outputting torque of the second output shaft, second and third speed gears rotatably disposed on the second output shaft, a second synchronizer selectively connecting the second speed gear to the second output shaft, and a third synchronizer selectively connecting the third speed gear to the second output shaft.

The second speed gear may be engaged with the second input gear and the third speed gear may be engaged with the fourth input gear.

The power transmission apparatus may further include a reverse speed generator disposed in parallel with the second speed output unit and achieving the reverse speed.

The reverse speed generator may include an idle shaft disposed in parallel with the second speed output unit, a reverse input gear fixedly disposed on one end portion of the idle shaft and engaged with the second speed gear, a reverse output gear rotatably disposed on another end portion of the idle shaft and engaged with the fourth input gear, and a fourth synchronizer selectively connecting the reverse output gear to the idle shaft.

According to various aspects of the present invention, a power transmission apparatus for a vehicle may include a first input shaft adapted to selectively receive torque of an engine, a second input shaft disposed without rotational interference with the first input shaft, adapted to selectively receive the torque of the engine, and having first and second input gears fixedly disposed thereon, a third input shaft disposed in a row with the second input shaft and without rotational interference with the first input shaft, and having third and fourth input gears fixedly disposed thereon, a planetary gear set including a first rotation element, a second rotation element directly connected to the third input shaft, and a third rotation element directly connected to the first input shaft, a motor/generator connected to the fourth input shaft and operated as a motor or a generator, a first clutch selectively connecting the engine to the first input shaft, a second clutch selectively connecting the engine to the second input shaft, a third clutch selectively connecting two rotation elements among three rotation elements of the planetary gear set and selectively direct-coupling the planetary gear set, a first speed output unit including a first output shaft disposed in parallel with the second and third input shafts, a first output gear fixedly disposed on the first output shaft and outputting torque of the first output shaft, a first speed gear rotatably disposed on the first output shaft and engaged with the third input gear, a fourth speed gear rotatably disposed on the first output shaft and engaged with the first input gear, and a first synchronizer selectively connecting the first speed gear or the fourth speed gear to the first output shaft, and a second speed output unit including a second output shaft disposed in parallel with the second and third input shafts, a second output gear fixedly disposed on the second output shaft and outputting torque of the second output shaft, a second speed gear rotatably disposed on the second output shaft and engaged with the second input gear, a third speed gear rotatably disposed on the second output shaft and engaged with the fourth input gear, a second synchronizer selectively connecting the second speed gear to the second output shaft, and a third synchronizer selectively connecting the third speed gear to the second output shaft.

The power transmission apparatus may further include a reverse speed generator having an idle shaft disposed in parallel with the second speed output unit, a reverse input gear fixedly disposed on one end portion of the idle shaft and engaged with the second speed gear, a reverse output gear rotatably disposed on another end portion of the idle shaft and engaged with the fourth input gear, and a fourth synchronizer selectively connecting the reverse output gear to the idle shaft.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of the exemplary power transmitting apparatus according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
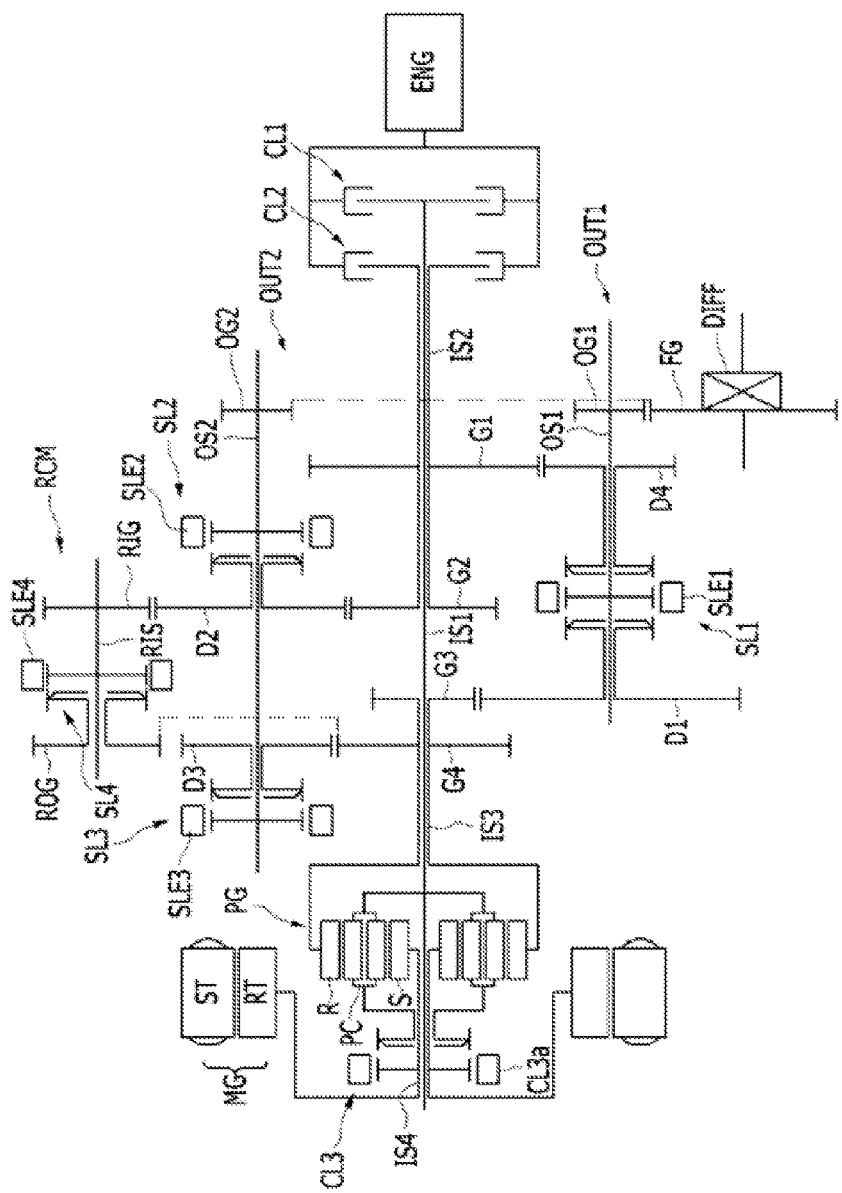
FIG. 1 is a schematic diagram of an exemplary power transmitting apparatus according to the present invention.

FIG. 1 is a schematic diagram of a power transmitting apparatus according to various embodiments of the present invention.

Referring to FIG. 1, a power transmission apparatus according to various embodiments of the present invention includes first, second, third, and fourth input shafts IS1, IS2, IS3, and IS4, a planetary gear set PG, a motor/generator MG, first, second, and third clutches CL1, CL2, and CL3, first and second speed output units OUT1 and OUT2, and a reverse speed generator RCM.

The first and second input shafts IS1 and IS2 are selectively connected to an output side of an engine ENG.

The second input shaft IS2 is a hollow shaft and is disposed at one end portion of the first input shaft IS1 without rotational interference therebetween.

First and second input gears G1 and G2 are sequentially and fixedly disposed on the second input shaft IS2 from one end to the other end.

The third input shaft IS3 is a hollow shaft and is disposed at a middle portion of the first input shaft IS1 without rotational interference therebetween.

Third and fourth input gears G3 and G4 are sequentially and fixedly disposed on the third input shaft IS3 from one end to the other end.

The fourth input shaft IS4 is a hollow shaft and is disposed at the other end portion of the first input shaft IS1 without rotational interference therebetween.

The first, second, third, and fourth input gears G1, G2, G3, and G4 are input gears operating at each speed. That is, the first input gear G1 is an input gear for achieving a fourth forward speed, the second input gear G2 is an input gear for achieving a second forward speed, the third input gear G3 is an input gear for achieving a first forward speed, and the fourth input gear G4 is an input gear for achieving a third forward speed.

Here, input gears for achieving even-numbered speeds are disposed on the second input shaft IS2, and input gears for achieving odd-numbered speeds are disposed on the third input shaft IS3.

The planetary gear set PG is disposed between the third input shaft IS3 and the fourth input shaft IS4 and includes first, second, and third rotation elements.

The first rotation element is directly connected to the fourth input shaft IS4, the second rotation element is directly connected to the third input shaft IS3, and the third rotation element is directly connected to the first input shaft IS1.

That is, the planetary gear set PG is a double pinion planetary gear set, wherein the first rotation element is a sun gear S, the second rotation element is a ring gear R, and the third rotation element is a planet carrier PC.

The motor/generator MG can be operated as a motor or a generator and is disposed at a radial exterior of the planetary gear set PG.

In addition, the motor/generator MG includes a stator ST fixed to a transmission housing and a rotor RT rotatably supported in the stator ST. The rotor RT is always connected to the sun gear S of the planetary gear set PG that is the first rotation element through the fourth input shaft IS4.

Therefore, the motor/generator MG may be operated as the generator using torque of the engine ENG and may charge a battery by generated electrical energy, or may be operated as the motor for generating driving torque.

The first clutch CL1 is disposed between the output side of the engine ENG and the first input shaft IS1, and selectively connects the first input shaft IS1 to the output side of the engine ENG.

The second clutch CL2 is disposed between the output side of the engine ENG and the second input shaft IS2, and selectively connects the second input shaft IS2 to the output side of the engine ENG.

The first and second clutches CL1 and CL2 are conventional multi-plate clutches of wet type and may be controlled by a hydraulic control system.

The third clutch CL3 is disposed at the other side of the planetary gear set PG, and selectively connects the fourth input shaft IS4 (or the sun gear S) to the first input shaft IS1 (or the planet carrier PC) so as to selectively direct-couple the planetary gear set PG. The third clutch CL3 may be a typical synchronizer.

Since the third clutch CL3 is well known to a person of an ordinary skill in the art, detailed description thereof will be omitted. In addition, a sleeve CL3a applied to the synchronizer, as well known to a person of an ordinary skill in the art, is operated by an additional actuator and the actuator is controlled by a transmission control unit.

The third clutch CL3 may not be a synchronizer and may be a dog clutch or a multi-plate hydraulic clutch.

The first speed output unit OUT1 includes a first output shaft OS1 disposed in parallel with and apart from the second and third input shafts IS2 and IS3, first and fourth speed gears D1 and D4, and a first synchronizer SL1 selectively connecting the first speed gear D1 or the fourth speed gear D4 to the first output shaft OS1.

The first speed gear D1 is engaged to the third input gear G3 and the fourth speed gear D4 is engaged to the first input gear G1.

In addition, the torque converted by the first speed output unit OUT1 is transmitted to a differential apparatus DIFF through a first output gear OG1 fixedly disposed on one end portion or the other end portion of the first output shaft OS1 and a final reduction gear FG engaged with the first output gear OG1.

The second speed output unit OUT2 includes a second output shaft OS2 disposed in parallel with and apart from the second and third input shafts IS2 and IS3, second and third speed gears D2 and D3, a second synchronizer SL2 selectively connecting the second speed gear D2 to the second output shaft OS2, and a third synchronizer SL3 selectively connecting the third speed gear D3 to the second output shaft OS2.

The second synchronizer SL2 is disposed at a side portion of the second output shaft OS2 and the third synchronizer SL3 is disposed at the other side portion of the second output shaft OS2.

The second speed gear D2 is engaged with the second input gear G2 and the third speed gear D3 is engaged with the fourth input gear G4.

In addition, the torque converted by the second speed output unit OUT2 is transmitted to the differential apparatus DIFF through a second output gear OG2 fixedly disposed on one end portion or the other end portion of the second output shaft IS2 and the final reduction gear FD engaged with the second output gear OG2.

In addition, second and third sleeves SLE2 and SLE3 of the second and third synchronizers SL2 and SL3 are disposed to face each other.

The reverse speed generator RCM includes an idle shaft RIS disposed in parallel with the second output shaft OS2, a reverse input gear RIG fixedly disposed on one end portion of the idle shaft RIS and engaged with the second speed gear D2 on the second output shaft OS2, and a reverse output gear ROG rotatably disposed on the other end portion of the idle shaft RIS and engaged with the fourth input gear G4 on the third input shaft IS3.

In addition, the reverse speed generator RCM further includes a fourth synchronizer SL4 disposed on the idle shaft RIS, and the fourth synchronizer SL4 selectively connects the reverse output gear ROG engaged with the fourth input gear G4 to the idle shaft RIS.

Since the first, second, third, and fourth synchronizers SL1, SL2, SL3, and SL4 are well known to a person of an ordinary skill in the art, detailed description thereof will be omitted. In addition, first, second, third, and fourth sleeves SLE1, SLE2, SLE3, and SLE4 applied respectively to the first, second, third, and fourth synchronizers SL1, SL2, SL3, and SL4, as well known to a person of an ordinary skill in the art, are operated by additional actuators and the actuators are controlled by a transmission control unit.

FIG. 2 is an operational chart of a power transmitting apparatus according to various embodiments of the present invention.

[Reverse Speed]

The vehicle is driven by the torque of the engine ENG at a reverse speed. At the reverse speed, the first speed gear D1 and the first output shaft OS1 are operably connected through the first sleeve SLE1 of the first synchronizer SL1 and the reverse output gear ROG and the idle shaft RIS are operably connected through the fourth sleeve SLE4 of the fourth synchronizer SL4. After that, if the second clutch CL2 is operated, the reverse speed is achieved.

In this case, the torque of the engine ENG is transmitted to the final reduction gear FG through the second clutch CL2, the second input shaft IS2, the second input gear G2, the second speed gear D2, the reverse input gear RIG, the idle shaft RIS, the reverse output gear ROG, the fourth input gear G4, the third input shaft IS3, the third input gear G3, the first speed gear D1, the first output shaft OS1, and the first output gear OG1.

[Neutral Charging]

If neutral charging is performed in a state of engine starting, the first speed gear D1 and the first output shaft OS1 are operably connected through the first sleeve SLE1 of the first synchronizer SL1 and the first clutch CL1 is operated.

In this case, the torque of the first input shaft IS1 is input to the planet carrier PC and the ring gear R is operated as a fixed element by the third input shaft IS3. Therefore, the sun gear S rotates at a high speed and causes the motor/generator MG to be operated as a generator. Therefore, the motor/generator MG generates electrical energy and the battery is charged by the electric energy.

[First Forward Speed]

The first speed gear D1 and the first output shaft OS1 are operably connected through the first sleeve SLE1 of the first synchronizer SL1 and the fourth input shaft IS4 (or the sun gear S) and the first input shaft IS1 (or the planet carrier PC) are operably connected through the sleeve CL3a of the third clutch CL3 at the first forward speed. After that, the first clutch CL1 is operated.

Therefore, the torque of the engine ENG is transmitted to the final reduction gear FG through the first clutch CL1, the first input shaft IS1, the planetary gear set PG, the third input shaft IS3, the third input gear G3, the first speed gear D1, the first output shaft OS1, and the first output gear OG1.

After shift to the first forward speed is completed, the second speed gear D2 and the second output shaft OS2 are operably connected through the sleeve SLE2 of the second synchronizer SL2 for a next shift to the second forward speed.

[Second Forward Speed]

If the vehicle speed increases at the first forward speed and the shift to the second forward speed is necessary, the first clutch CL1 is released and the sleeve CL3a of the third clutch CL3 is moved to a neutral position so as to disconnect the fourth input shaft IS4 (or the sun gear S) and the first input shaft IS1 (or the planet carrier PC). After that, the second clutch CL2 is operated.

As described above, in a state that the second speed gear D2 and the second output shaft OS2 are operably connected through the sleeve SLE2 of the second synchronizer SL2, the torque of the engine ENG is transmitted to the final reduction gear FG through the second clutch CL2, the second input shaft IS2, the second input gear G2, the second speed gear D2, the second output shaft OS2, and the second output gear OG2.

After the shift to the second forward speed is completed, the first sleeve SLE1 of the first synchronizer SL1 is moved to a neutral position and the third speed gear D3 and the second output shaft OS2 are operably connected through the third sleeve SLE3 of the third synchronizer SL3 for a next shift to the third forward speed.

[Third Forward Speed]

If the vehicle speed increases at the second forward speed and the shift to the third forward speed is necessary, the second clutch CL2 is released and the fourth input shaft IS4 (or the sun gear S) and the first input shaft IS1 (or the planet carrier PC) are operably connected through the sleeve CL3a of the third clutch CL3. After that, the first clutch CL1 is operated.

As described above, in a state that the third speed gear D3 and the second output shaft OS2 are operably connected through the third sleeve SLE3 of the third synchronizer SL3, the torque of the engine ENG is transmitted to the final reduction gear FG through the first clutch CL1, the first input shaft IS1, the planetary gear set PG, the third input shaft IS3, the fourth input gear G4, the third speed gear D3, the second output shaft OS2, and the second output gear OG2.

After the shift to the third forward speed is completed, the sleeve SLE2 of the second synchronizer SL2 is moved to the neutral position and the fourth speed gear D4 and the first output shaft OS1 are operably connected through the first sleeve SLE1 of the first synchronizer SL1 for a next shift to the fourth forward speed.

[Fourth Forward Speed]

If the vehicle speed increases at the third forward speed and the shift to the fourth forward speed is necessary, the first clutch CL1 is released and the sleeve CL3a of the third clutch CL3 is moved to the neutral position so as to disconnect the fourth input shaft IS4 (or the sun gear S) and the first input shaft IS1 (or the planet carrier PC). After that, the second clutch CL2 is operated.

As described above, in a state that the fourth speed gear D4 and the first output shaft OS1 are operably connected through the first sleeve SLE1 of the first synchronizer SL1, the torque of the engine ENG is transmitted to the final reduction gear FG through the second clutch CL2, the second input shaft IS2, the first input gear G1, the fourth speed gear D4, the first output shaft OS1, and the first output gear OG1.

After the shift to the fourth forward speed is completed, the third sleeve SLE3 of the third synchronizer SL3 is moved to the neutral position.

[EV Reverse Speed]

In a state that the engine is stopped, the first output shaft IS1 and the first speed gear D1 are operably connected through the first sleeve SLE1 of the first synchronizer SL1 and the third clutch CL3 is operated at electric vehicle (EV) reverse speed.

Since the planetary gear set PG becomes the direct-coupling state by operation of the third clutch CL3, inverse torque of the motor/generator MG is transmitted to the final reduction gear FG through the fourth input shaft IS4, the third clutch CL3, the planetary gear set PG, the third input shaft IS3, the third input gear G3, the first speed gear D1, the first output shaft OS1, and the first output gear OG1.

The shift processes are illustrated when speed rises sequentially. If speed lowers sequentially, shift processes are performed in an inverse manner.

During the shifting processes, the driving torque of the motor/generator MG may be used as auxiliary torque for the engine ENG. In addition, when the vehicle is driven by the torque of the engine ENG, the rotor RT of the motor/generator MG always rotates. Therefore, the motor/generator MG generates electric energy and the generated electrical energy is used to charge the battery.

In addition, the power transmitting apparatus according to various embodiments of the present invention can achieve two forward speeds at a hybrid electric vehicle (HEV) mode.

Since both of the engine ENG and the motor/generator MG are operated at the HEV mode, a shift to a speed related to the third input shaft IS3 is possible.

Therefore, the first forward speed is achieved as a first HEV speed and the third forward speed is achieved as a second HEV speed. At this time, the third clutch CL3 is positioned at a neutral position.

That is, the torque of the engine ENG and the torque of the motor/generator MG are input to the planetary gear set PG, and the torques of the engine ENG and the motor/generator MG are transmitted to the third input shaft IS3.

In addition, the power transmitting apparatus according to various embodiments of the present invention can achieve two forward speeds at an electric vehicle (EV) mode.

Since the vehicle is driven only by the torque of the motor/generator MG at the EV mode, a shift to a speed related to the third input shaft IS3 is possible.

Therefore, the first forward speed is achieved as a first EV speed and the third forward speed is achieved as a second EV speed. At this time, the fourth input shaft IS4 (or the sun gear S) and the first input shaft IS1 (or the planet carrier PC) are operably connected by operation of the third clutch CL3 and the planetary gear set PG becomes the direct-coupling state.

That is, since the planetary gear set PG becomes the direct-coupling state, the torque of the motor/generator MG is transmitted to the third input shaft IS3.

The power transmission apparatus for a vehicle according to various embodiments of the present invention can achieve four forward speeds and one reverse speed by the torque of the engine ENG, achieve two forward speeds at the HEV mode by the torque of the engine ENG and the torque of the motor/generator MG, and achieved two forward speeds and one reverse speed at the EV mode by the torque of the motor/generator MG. Therefore, fuel economy may be enhanced.

In addition, smooth starting may be performed without slip of friction members by the engine ENG and the motor/generator MG connected respectively to rotation elements of the planetary gear set PG. In addition, starting is possible only by the motor/generator MG in a state that the engine is stopped.

Since the slip of the friction members does not occur when starting, durability of the friction members may be improved, energy loss may be minimized, and fuel economy may be enhanced.

Since shift is executed not by slip of the friction members but by the motor/generator MG, smooth shift may be possible.

In addition, when the vehicle runs by the torque of the engine ENG, the motor/generator MG can supply auxiliary torque. Therefore, acceleration performance may be improved.

If the engine is stopped, the reverse speed can be achieved by rotating the motor/generator MG inversely.

Figure 3:
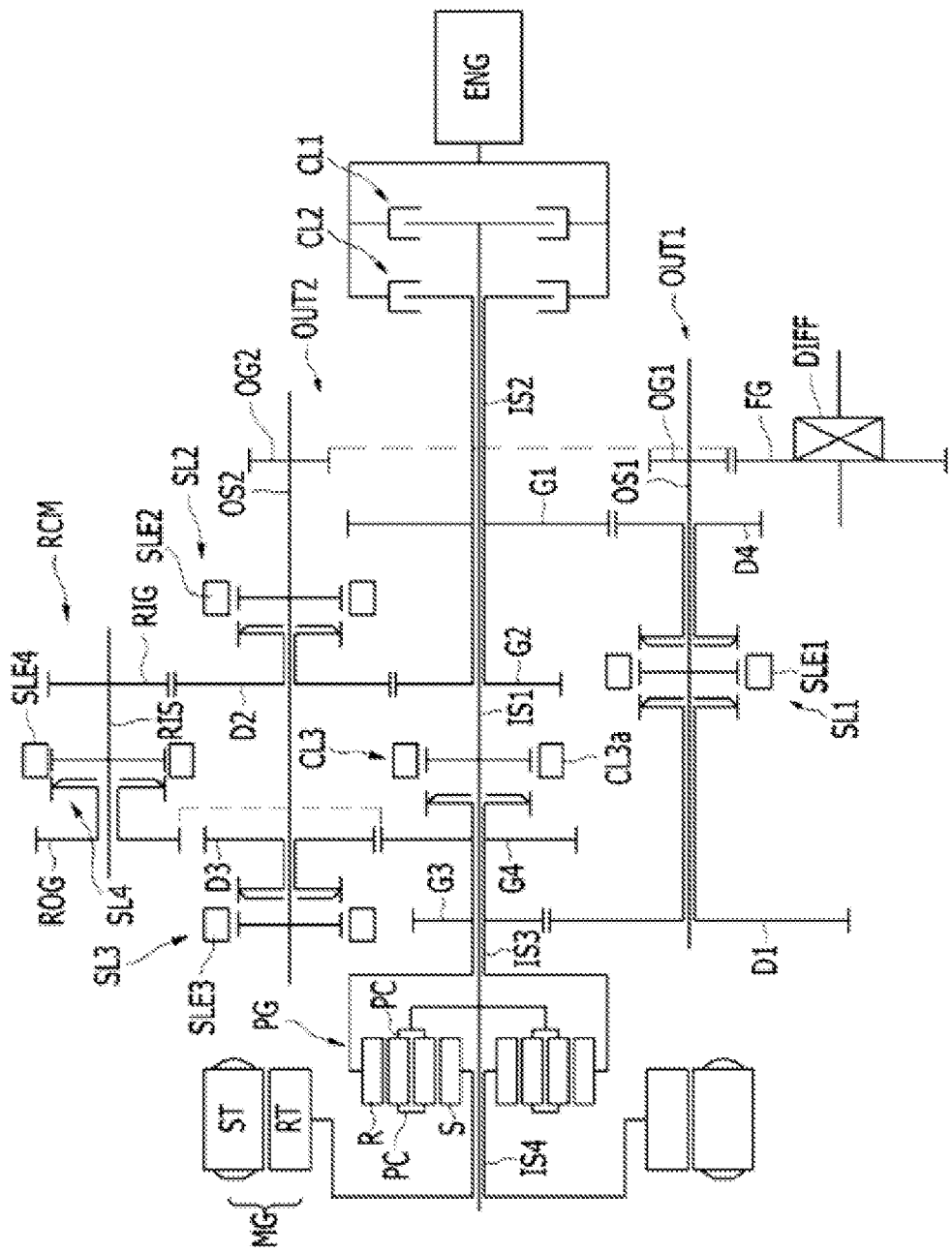
FIG. 3 is a schematic diagram of an exemplary power transmitting apparatus according to the present invention.

FIG. 3 is a schematic diagram of a power transmitting apparatus according to various embodiments of the present invention.

Referring to FIG. 3, the third clutch CL3 is disposed at the other side of the planetary gear set PG in the previously described embodiments, but the third clutch CL3 is disposed on one end portion of the third input shaft IS3 in the various embodiments illustrated in FIG. 3.

Therefore, the third clutch CL3 can selectively connect the first input shaft IS1 (or the planet carrier PC) to the fourth input shaft IS4 (or the sun gear S) in the previously described embodiments, but the third clutch CL3 can selectively connect the first input shaft IS1 (or the planet carrier PC) to the third input shaft IS3 (or the ring gear R) in the various embodiments illustrated in FIG. 3.

Since a layout and function are the same as those of previously described embodiments except a position of the third clutch CL3, detailed description thereof will be omitted.

Figure 4:
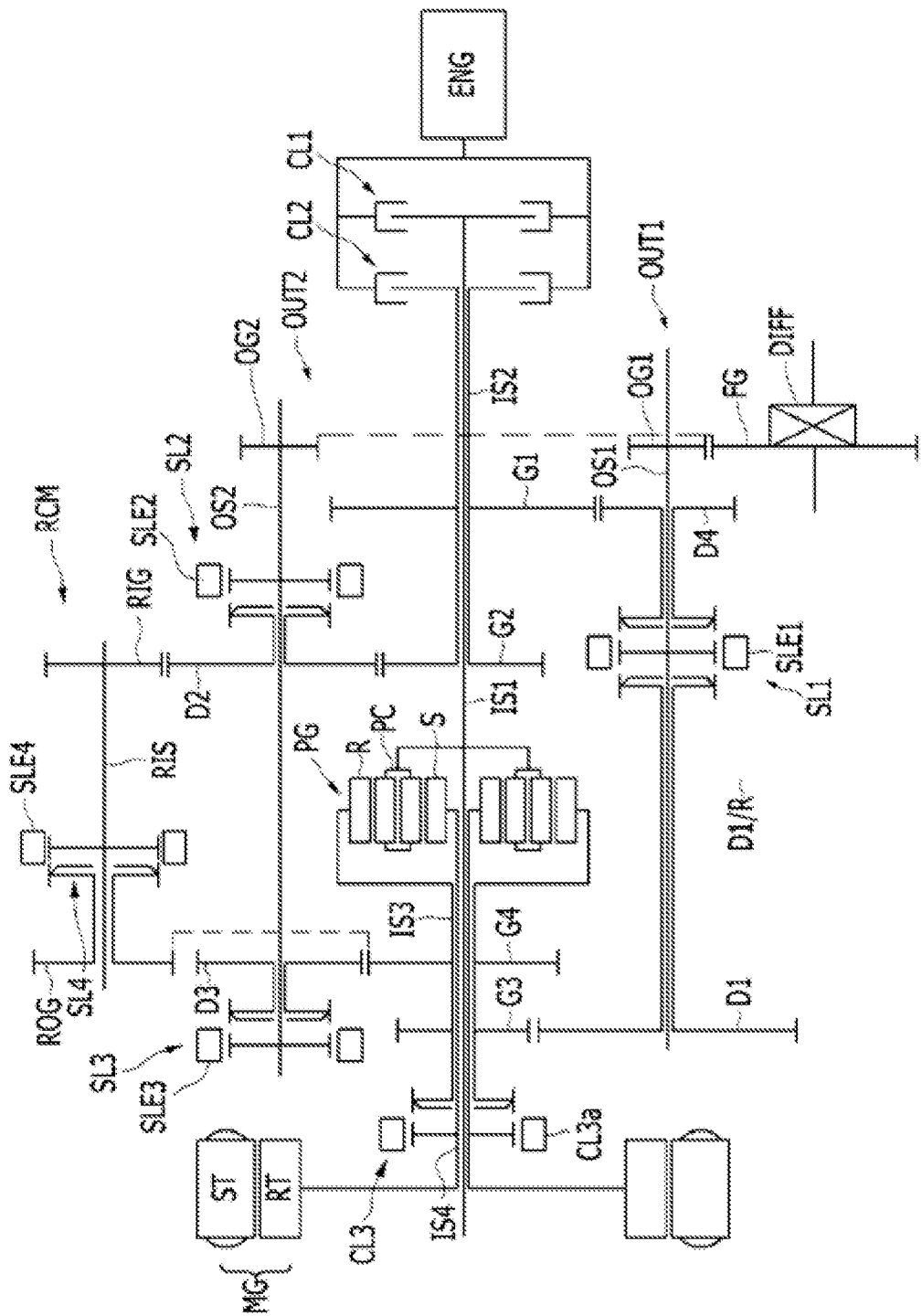
FIG. 4 is a schematic diagram of an exemplary power transmitting apparatus according to the present invention.

FIG. 4 is a schematic diagram of a power transmitting apparatus according to various embodiments of the present invention.

Referring to FIG. 4, the planetary gear set PG is disposed between the third input shaft IS3 and the fourth input shaft IS4 in the previously described embodiments, but the planetary gear set PG is disposed between the second input shaft IS2 and the third input shaft IS3 in the various embodiments illustrated in FIG. 4.

For this purpose, the fourth input shaft IS4 is disposed between the first input shaft IS1 and the third input shaft IS3 in a radial direction, and one end portion of the third input shaft IS3 is connected to the ring gear R of the planetary gear set PG that is the second rotation element.

Therefore, the third clutch CL3 selectively connects the third input shaft IS3 to the fourth input shaft IS4 to cause the planetary gear set PG to become the direct-coupling state.

Since a layout and function are the same as those of previously described embodiments except a position of the planetary gear set PG, detailed description thereof will be omitted.

The power transmission apparatus for a vehicle according to various embodiments of the present invention can achieve four forward speeds and one reverse speed by the torque of the engine, achieve two forward speeds at the HEV mode by the torque of the engine and the torque of the motor/generator, and achieved two forward speeds and one reverse speed at the EV mode by the torque of the motor/generator. Therefore, fuel economy may be enhanced.

In addition, smooth starting may be performed without slip of friction members by the engine and the motor/generator connected respectively to rotation elements of the planetary gear set. In addition, starting is possible only by the motor/generator in a state that the engine is stopped.

Since the slip of the friction members does not occur when starting, durability of the friction members may be improved, energy loss may be minimized, and fuel economy may be enhanced.

Since shift is executed not by slip of the friction members but by the motor/generator, smooth shift may be possible.

In addition, when the vehicle runs by the torque of the engine, the motor/generator can supply auxiliary torque. Therefore, acceleration performance may be improved.

If the engine is stopped, the reverse speed can be achieved by rotating the motor/generator inversely.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmission apparatus for a vehicle comprising:
    a first input shaft adapted to selectively receive torque of an engine;
    a second input shaft disposed without rotational interference with the first input shaft, adapted to selectively receive the torque of the engine, and having at least one input gear fixedly disposed thereon;
    a third input shaft disposed in a row with the second input shaft and without rotational interference with the first input shaft, and having at least one input gear fixedly disposed thereon;
    a planetary gear set including a first rotation element, a second rotation element directly connected to the third input shaft, and a third rotation element directly connected to the first input shaft;
    a motor/generator directly connected to the first rotation element and operated as a motor or a generator;
    a first speed output unit adapted to convert torque input from the second input shaft or the third input shaft and output the converted torque;
    a second speed output unit adapted to convert torque input from the second input shaft or the third input shaft and output the converted torque;
    a reverse speed generator disposed in parallel with the second speed output unit and achieving the reverse speed;
    a first clutch selectively connecting the engine to the first input shaft;
    a second clutch selectively connecting the engine to the second input shaft; and
    a third clutch selectively connecting two rotation elements among the first, second and third rotation elements of the planetary gear set and selectively direct-coupling the planetary gear set,
    wherein a first input gear for achieving a fourth forward speed and a second input gear for achieving a second forward speed are fixedly disposed on the second input shaft, and
    a third input gear for achieving a first forward speed or a reverse speed and a fourth input gear for achieving a third forward speed are fixedly disposed on the third input shaft.

2. The power transmission apparatus of claim 1, wherein the at least one input gear fixedly disposed on the second input shaft achieves an even-numbered speed, and
    the at least one input gear fixedly disposed on the third input shaft achieves an odd-numbered speed.

3. The power transmission apparatus of claim 1, wherein the planetary gear set is a double pinion planetary gear set, the first rotation element is a sun gear, the second rotation element is a ring gear, and the third rotation element is a planet carrier.

4. The power transmission apparatus of claim 1, wherein each of the second and third input shafts is a hollow shaft, and the first input shaft penetrates through the second and third input shafts.

5. The power transmission apparatus of claim 4, wherein the second and third input shafts are disposed in a sequence of the second and third input shafts from one end to another end of the first input shaft.

6. The power transmission apparatus of claim 5, wherein the third clutch is disposed at one side of the planetary gear set and selectively connects the first input shaft to the motor/generator so as to direct-couple the planetary gear set.

7. The power transmission apparatus of claim 5, wherein the third clutch is disposed on one end portion of the third input shaft and selectively connects the first input shaft to the third input shaft so as to direct-couple the planetary gear set.

8. The power transmission apparatus of claim 5, wherein the third clutch is disposed at another end portion of the third input shaft and selectively connects the third input shaft with the motor/generator so as to direct-couple the planetary gear set.

9. The power transmission apparatus of claim 1, wherein the first speed output unit comprises:
    a first output shaft disposed in parallel with the second and third input shafts;
    a first output gear fixedly disposed on the first output shaft and outputting torque of the first output shaft;
    first and fourth speed gears rotatably disposed on the first output shaft; and
    a first synchronizer selectively connecting the first speed gear or the fourth speed gear to the first output shaft.

10. The power transmission apparatus of claim 9, wherein the first speed gear is engaged with the third input gear and the fourth speed gear is engaged with the first input gear.

11. The power transmission apparatus of claim 9, wherein the second speed output unit comprises:
- a second output shaft disposed in parallel with the second and third input shafts;
- a second output gear fixedly disposed on the second output shaft and outputting torque of the second output shaft;
- second and third speed gears rotatably disposed on the second output shaft;
- a second synchronizer selectively connecting the second speed gear to the second output shaft; and
- a third synchronizer selectively connecting the third speed gear to the second output shaft.

12. The power transmission apparatus of claim 11, wherein the second speed gear is engaged with the second input gear and the third speed gear is engaged with the fourth input gear.

13. The power transmission apparatus of claim 11, wherein the reverse speed generator comprises:
- an idle shaft disposed in parallel with the second speed output unit;
- a reverse input gear fixedly disposed on one end portion of the idle shaft and engaged with the second speed gear;
- a reverse output gear rotatably disposed on another end portion of the idle shaft and engaged with the fourth input gear; and
- a fourth synchronizer selectively connecting the reverse output gear to the idle shaft.

14. A power transmission apparatus for a vehicle comprising:
- a first input shaft adapted to selectively receive torque of an engine;
- a second input shaft disposed without rotational interference with the first input shaft, adapted to selectively receive the torque of the engine, and having first and second input gears fixedly disposed thereon;
- a third input shaft disposed in a row with the second input shaft and without rotational interference with the first input shaft, and having third and fourth input gears fixedly disposed thereon;
- a planetary gear set including a first rotation element, a second rotation element directly connected to the third input shaft, and a third rotation element directly connected to the first input shaft;
- a motor/generator directly connected to the first rotation element and operated as a motor or a generator;
- a first clutch selectively connecting the engine to the first input shaft;
- a second clutch selectively connecting the engine to the second input shaft;
- a third clutch selectively connecting two rotation elements among three rotation elements of the planetary gear set and selectively direct-coupling the planetary gear set;
- a first speed output unit including:
  - a first output shaft disposed in parallel with the second and third input shafts;
  - a first output gear fixedly disposed on the first output shaft and outputting torque of the first output shaft;
  - a first speed gear rotatably disposed on the first output shaft and engaged with the third input gear;
  - a fourth speed gear rotatably disposed on the first output shaft and engaged with the first input gear; and
  - a first synchronizer selectively connecting the first speed gear or the fourth speed gear to the first output shaft;
- a second speed output unit including:
  - a second output shaft disposed in parallel with the second and third input shafts;
  - a second output gear fixedly disposed on the second output shaft and outputting torque of the second output shaft;
  - a second speed gear rotatably disposed on the second output shaft and engaged with the second input gear;
  - a third speed gear rotatably disposed on the second output shaft and engaged with the fourth input gear;
  - a second synchronizer selectively connecting the second speed gear to the second output shaft; and
  - a third synchronizer selectively connecting the third speed gear to the second output shaft; and
- a reverse speed generator including:
  - an idle shaft disposed in parallel with the second speed output unit;
  - a reverse input gear fixedly disposed on one end portion of the idle shaft and engaged with the second speed gear;
  - a reverse output gear rotatably disposed on another end portion of the idle shaft and engaged with the fourth input gear; and
  - a fourth synchronizer selectively connecting the reverse output gear to the idle shaft.

* * * * *